UNITED STATES PATENT OFFICE.

JACOB BRINKERHOFF, OF AUBURN, NEW YORK.

IMPROVEMENT IN PREPARING WOOD FOR THE BEARINGS IN CLOTHES-WRINGERS.

Specification forming part of Letters Patent No. 132,194, dated October 15, 1872.

*To all whom it may concern:*

Be it known that I, JACOB BRINKERHOFF, of Auburn, in the county of Cayuga and State of New York, have invented a certain new and useful Process of Making or Preparing Bearings for Wringing-Machines; and I do hereby declare that the following is a full, clear, and exact description thereof, that will enable others skilled in the art to which it appertains to make and use the same.

In clothes-wringers the bearings for the rollers need always more or less oiling, and the oil used for this purpose is often liable to get on the clothes as the clothes pass between the rollers, and consequently injures the clothes.

To obviate this difficulty is the object of my invention; and it consists in preparing the wood bearings for the rollers of a clothes-wringer with tallow; and in order to enable others skilled in the art to which my invention appertains to make and use the same, I will now proceed to describe the manner in which the same is performed.

The wood bearings for the rollers are saturated fully in a bath of hot melted tallow and then cooled in the same—that is, the bearings are allowed to remain in the tallow until both the bearings and tallow are entirely cool.

With bearings prepared in this manner there is no necessity for oiling, and hence no liability of spoiling the clothes as they pass through between the rollers.

The wood bearings for old clothes-wringers which have heretofore been oiled may be prepared in this manner just as well as those for new wringers.

Having thus fully described my invention, what I claim as new, and desire to secure by Letters Patent, is—

1. The process of preparing the wood bearings for the rollers of clothes-wringers by saturating them in hot tallow and letting them cool in the same, substantially as described.

2. The wood bearings, when the same are prepared by saturating in hot tallow and cooled therein, and used in combination with the frame and rollers of a wringing-machine, substantially as for the purposes herein set forth.

In testimony that I claim the foregoing I have hereunto set my hand this 19th day of August, 1872.

JACOB BRINKERHOFF.

Witnesses:
 HORACE T. COOK,
 C. W. WILDS.